D. W. SHARES.
Cultivator.
No. 16,498. Patented Jan. 27, 1857.
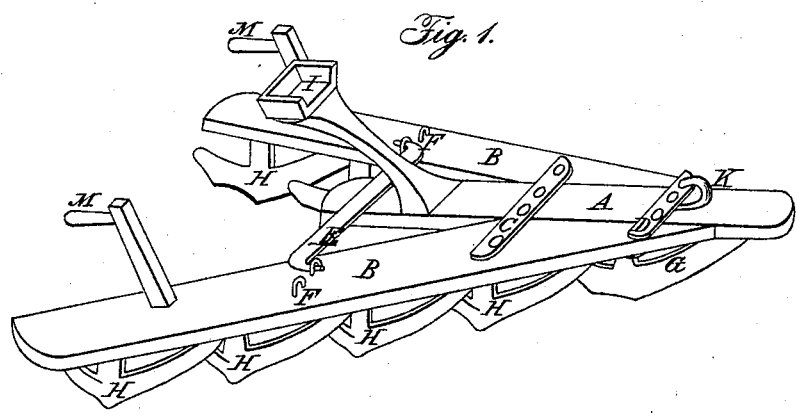
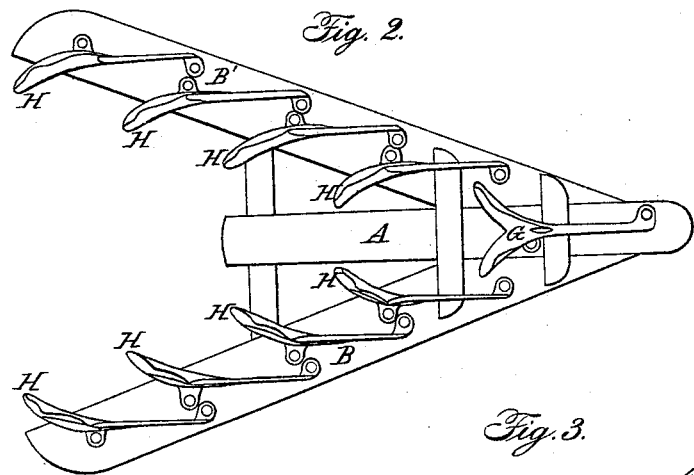
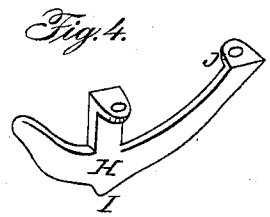
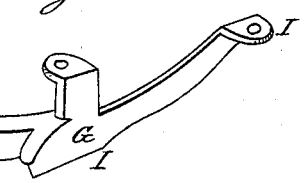
Witnesses:
John D Caude
Thos Bennett
Inventor:
Daniel W Shares

UNITED STATES PATENT OFFICE.

DANIEL W. SHARES, OF HAMDEN, CONNECTICUT.

IMPROVEMENT IN HARROWS.

Specification forming part of Letters Patent No. 16,498, dated January 27, 1857.

*To all whom it may concern:*

Be it known that I, DANIEL W. SHARES, of Hamden, in the county of New Haven and State of Connecticut, have invented a new and useful Agricultural Implement, which I term a "Colter-Harrow," and which combines in itself the advantages and produces the effects of both a cultivator and a harrow; and I do hereby declare that the following is a full and exact description thereof, reference being had to the accompanying drawings, and to the letters of reference marked thereon, wherein—

Figure 1 is a perspective view of the implement, and Fig. 2 a view of the under side of the same. Fig. 3 is a perspective view of the front tooth, and Fig. 4 a similar view of one of the rear teeth detached.

A is the center bar of the harrow-frame, and B B' the two side bars of the same. These may be made in about the proportions represented, of any length or material desired. The two side bars are connected to the center bar at their forward ends by pins passing through them and the plate C, upon which pins they have a limited motion sidewise, to allow them to be expanded or contracted in width at their rear ends, to make the track of the teeth closer to or more distant from each other, to suit the different kinds of work to which the implement may be put. The rear ends of the side bars are prevented from sagging or falling below their proper line by the bar D, attached to the forward end of the center bar, against which the upper sides of their forward ends bear and are supported. The side bars are adjusted and retained in position by the catch-lever E and the staples F, of the latter of which there may be as many as can conveniently be placed on the width of the bars, to make the adjustment more minute. When it is desired to alter the width of the track of the implement the lever E, rotating on a pin at its center, is unhooked from the staples on each side and hooked into those nearer to or farther from the inner edge, as it may be desired to have the track made narrower or wider than the gage to which it was before set.

G is the front tooth, attached to the front end of the center bar, having two divergent wings to throw the soil to each side of the track of the opening or cutting portion of it; H, the rear teeth, placed on the side bars in series equidistantly from each other both in the line of their length and breadth. The divergent wing or covering portion of them is formed with such curve toward the center of the track of the implement (the curve of the teeth on one side being opposite from those on the other) as will best subserve the purpose of loosening up and mollifying the soil and cover it into the track of the preceding tooth, without overturning it or laying it over in the manner effected by the mold-board of a plow. The front or opening portion of the tooth H is made at a proper angle to permit its easy entrance to the required depth in the soil, and is placed on the bars in line with the direction of the movement of the implement. The line of the front part of the teeth is continued a short distance below the line of the bottom edge of the covering portion of them to form the point I, which will elevate the teeth when cutting into stumps or roots or when coming into contact with stones or other impediments, to prevent the covering portion of it being broken or damaged. The teeth are secured to the bars by bolts inserted through the flanges J, which flanges are placed in opposite directions to each other to give greater stability and firmness to them when in use.

K is a draw-hook by which the implement is moved, the team which draws it being guided by a driver sitting in the seat L, while another attendant controls it by the handles M; or both duties may be performed by one person, if desired.

The advantages of my improved implement are that it effects at one operation the purposes effected by the two separate implements of a harrow and a cultivator in a more perfect manner, in much less time, and with the expenditure of less power than is required to operate either of them singly, while it is less subject to be injured in use by stumps, stones, and other impediments; that it can be readily adjusted in width to suit the various purposes to which it may be applied, and is not liable to be clogged when in use, as the teeth clear themselves perfectly from the soil through which they are drawn.

I do not claim the particular construction of the frame or the shape given to it, as described; nor do I claim making the frame adjustable to different widths; but What I do claim as my invention, and desire to secure by Letters Patent, is—

The construction and arrangement of the series of teeth H on the side bars, B B', in relation to the said bars and to each other, in the manner and for the purpose specified.

DANIEL W. SHARES.

Witnesses:
 JOHN D. CANDEE,
 THOS. BENNETT.